United States Patent Office 3,242,170
Patented Mar. 22, 1966

3,242,170
1-(PHENYL-HYDROCARBYL)-4-HYDROXY-PHENYL-4-CARBALKOXY-PIPERIDINES
Herbert Merz, Kurt Freter, Hans-D. Schroeder, and Karl Zeile, Ingelheim, Germany, assignors, by mesne assignments, to Boehringer Ingelheim G.m.b.H., Ingelheim am Rhine, Germany, a corporation of Germany
No Drawing. Filed Jan. 21, 1963, Ser. No. 252,565
Claims priority, application Germany, Jan. 30, 1962, B 65,714, B 65,715
5 Claims. (Cl. 260—240)

This invention relates to novel piperidine substitution products, namely 1-(phenyl-hydrocarbyl)-4-hydroxyphenyl-4-carbalkoxy-piperidines and their acid addition salts, as well as to various methods of preparing such compounds.

More particularly, the present invention relates to piperidine substition products of the formula

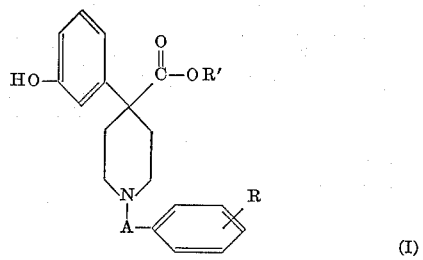

wherein
A is straight-chain alkylene of 3 to 4 carbon atoms or straight-chain alkenylene of 3 to 4 carbon atoms whose double bond stands in conjugated position with respect to the adjacent phenyl substituent,
R is hydrogen, hydroxyl, lower alkoxy or lower alkyl in the 3- or 4-position, and
R' is alkyl of 1 to 2 carbon atoms, and their non-toxic, pharmacologically acceptable acid addition salts.

The compounds embraced by Formula I may be prepared by a number of methods which are known in principle; however, the following have been found to be most convenient and efficient:

*Method A*.—Introduction of the substituent

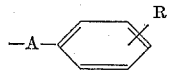

wherein A and R have the meanings defined in connection with Formula I, into a 4-(3'-hydroxyphenyl)-4-carbalkoxy-piperidine of the formula

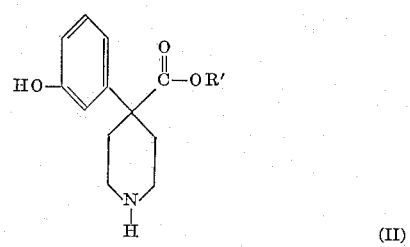

wherein R' has the same meanings as defined in Formula I. This introduction may be effected by a variety of methods, among them the following:

(a) By reacting a piperidine substitution product of the Formula II with a compound of the formula

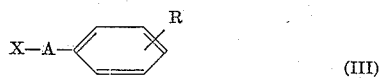

wherein A and R have the same meanings as in Formula I and X is halogen, sulfate (—OSO₂OH), arylsulfonyl (—OSO₂-aryl) or alkylsulfonyl (—OSO₂-alkyl).

This reaction is advantageously performed in the presence of an inert organic solvent and a base, such as sodium bicarbonate or sodium carbonate, at temperatures between 50 and 150° C. The reactants may be provided in a molar ratio of 1:1, but it is preferred to use Compound III in excess of ¹⁄₁₀ molar equivalent.

(b) By reacting a piperidine substitution product of the Formula II with an aryl-hydroxyalkyl compound of the formula

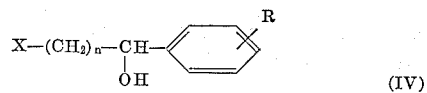

wherein R and X have the same meanings as in Formula III and n is a whole number from 2 to 3, inclusive.

This reaction is carried out under the same conditions as the reaction described in (a) above. The reaction product thus obtained, that is, the 1-(phenyl-hydroxyalkyl)-4-hydroxyphenyl-4-carbalkoxy-piperidine substitution products of the formula

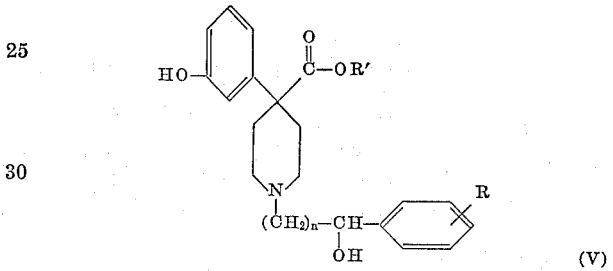

wherein R, R' and n have the meanings previously defined, is then transformed by dehydration into the corresponding 1-phenylalkenyl-4-hydroxyphenyl-4-carbalkoxy-piperidine substitution products which, if desired, may in turn be transformed by hydrogenation into the corresponding 1-phenylalkyl-4-hydroxyphenyl-4-carbalkoxy-piperidine substitution products.

The dehydration reaction is carried out in the presence of customary dehydration agents, most advantageously strong acids, at temperatures of 0 to 120° C. in water or organic solvents, such as ethanol or acetone.

The hydrogenation reaction may, for example, be effected catalytically in the presence of palladium as the catalyst.

(c) By reacting a piperidine substitution product of the Formula II with an aryloxoalkyl compound of the formula

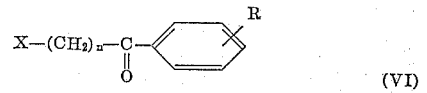

wherein R, X and n have the same meanings as in Formula IV, under the conditions described in (a) above, thereafter reducing the reaction product of the formula

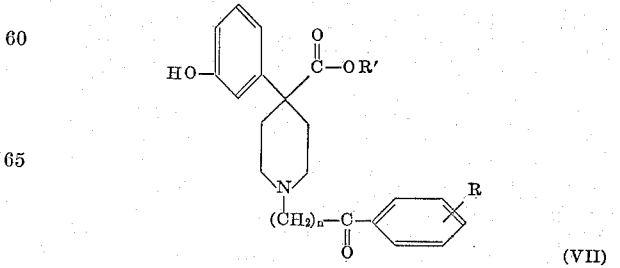

wherein R, R' and n have the meanings previously defined, with a ketone-specific reducing agent to form the corresponding 1-(phenyl-hydroxyalkyl)-4-hydroxyphenyl- 4-carbalkoxy-piperidine substitution product, and converting the latter into a compound of the Formula I by the dehydration and hydrogenation methods described under (b) above.

The reduction with the ketone-specific reducing agent is preferably performed in alcoholic aqueous solution in the presence of sodium boronhydride as the reducing agent.

(d) By subjecting a piperidine substitution product of the Formula II to a Mannich reaction with formaldehyde and a compound having an active hydrogen atom.

This method is only suitable for the preparation of compounds of the Formula I wherein A is an alkylene or alkenylene radical of 3 carbon atoms.

The Mannich reaction may be effected with an acetophenone Compound VIII in accordance with the following reaction equation:

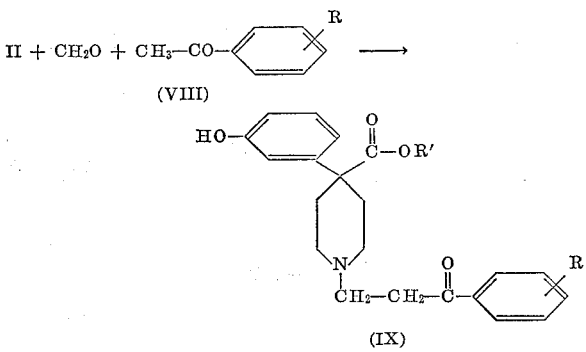

Alternatively, the Mannich reaction may be carried out with a phenylacetylene Compound X in accordance with the following reaction equation:

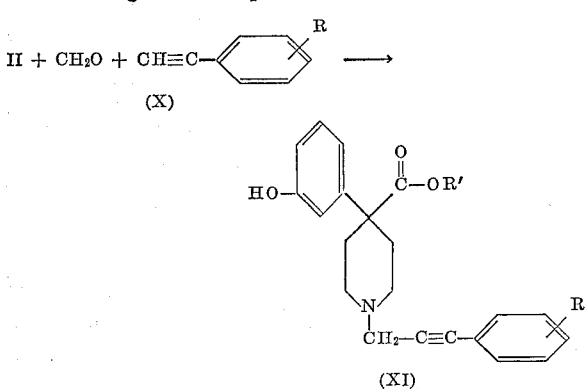

In both of these reaction equations R and R' have the meanings previously defined in connection with Formula I.

The Mannich reaction with the acetophenone Compound VIII is advantageously performed in acid solution and in the presence of a lower alkanol at temperatures between 60 and 120° C. The Mannich reaction with the phenylacetylene Compound X is advantageously performed with the piperidine substitution product II in the form of its free base and in the presence of dioxane as a solvent. In either case, the reaction mixture is worked up in customary fashion, and the reaction products IX and XI are preferably isolated in the form of their hydrochlorides.

The transformation of the 1-aryloxopropyl-4-hydroxyphenyl-4-carbalkoxy-piperidine substitution product IX into the corresponding compounds of the Formula I wherein A is alkylene or alkenylene of 3 carbon atoms is effected by the method described under (c) above.

The 1-arylpropinyl-4-hydroxyphenyl-4-carbalkoxy-piperidine substitution product XI may be transformed into the corresponding compounds of the Formula I wherein A is alkylene or alkenylene of 3 carbon atoms by partial or complete hydrogenation, such as by catalytic hydrogenation in the presence of palladium catalysts until the calculated amount of hydrogen has been absorbed. However, the partial hydrogenation is advantageously effected with the aid of poisoned catalysts (Lindlar catalysts).

The 4-hydroxyphenyl-4-carbalkoxy-piperidine substitution product II, which is used as the starting material in the various methods just described, may be prepared, for example, by treating a 1-(p-toluene-sulfonyl)-4-(3'-alkoxyphenyl)-4-cyano-piperidine (see copending application Ser. No. 177,171, filed March 5, 1962) with concentrated hydrobromic acid in the presence of phenol, and thereafter esterifying the reaction product with methanol or ethanol in the presence of hydrogen chloride gas or concentrated sulfuric acid.

*Method B.*—Alkaline condensation of 3-hydroxybenzylcyanide with a di($\beta$-haloethyl)-phenylalkylamine or a di-($\beta$-haloethyl)-arylalkenylamine to form a 1-(phenylalkyl)- or 1-(phenyl-alkenyl)-4-cyano-4-hydroxyphenyl-piperidine Compound XII, which is subsequently hydrolized and then esterified with methanol or ethanol, according to the following reaction equation:

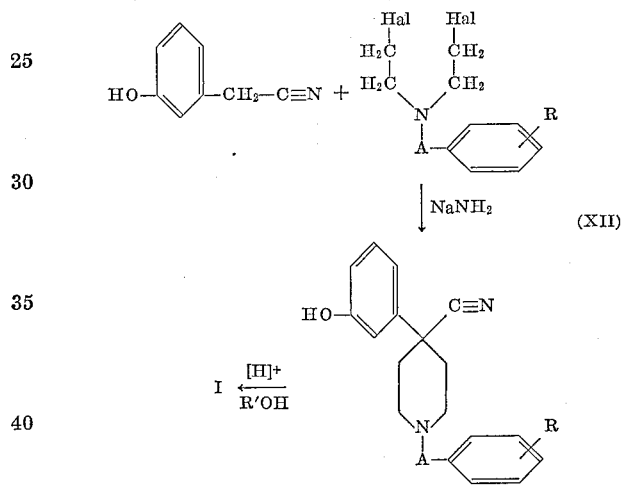

In this equation, A, R and R' have the same meanings as in Formula I, and Hal is a halogen.

In the alkaline condensation reaction it is preferred to use powdered sodium amide as the basic condensation agent. The condensation reaction is advantageously performed in the presence of an inert organic solvent at temperatures between 50 and 200° C.

The subsequent hydrolysis may be performed with an alkali or an acid, and thereafter the free carbonyl group formed in the 4-position from the cyano group is esterified in customary fashion with methanol or ethanol. Most advantageously, however, the cyano group is transformed into the carboxyl group with the aid of concentrated sulfuric acid in the presence of the esterifying alcohol in a single reaction step.

*Method C.*—Reaction of a 1,5-dihalo-3-hydroxyphenyl-3-carbalkoxy-pentane with a phenylalkylamine or phenyl-alkenylamine of the Formula XIII below, pursuant to the following reaction equation:

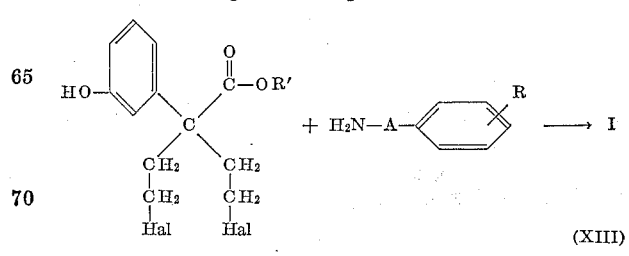

In this equation, A, R and R' have the meanings previously defined, and Hal is a halogen.

The reaction is performed in customary fashion, preferably in the presence of an inert organic solvent and of a basic condensation agent, such as sodium carbonate or dimethylaniline, at temperatures between 50 and 150° C.

*Method D.*—Reaction of 3-hydroxybenzyl-cyanide with a 1-halo-2-amino-ethane substitution product of the Formula XIV below, reaction of the resulting product with a disubstituted ethane of the Formula XV below to effect ring closure, conversion of the nitrile group of the resulting quaternary piperidinium Compound XVI into the carboxyl group by hydrolysis, esterification of the carboxyl group with an alkanol, and removal of the benzyl substituent from the quaternary nitrogen by reduction. This particular method may be used only for the preparation of those compounds of the Formula I wherein A is alkylene, and may be represented by the following sequence of reaction equations:

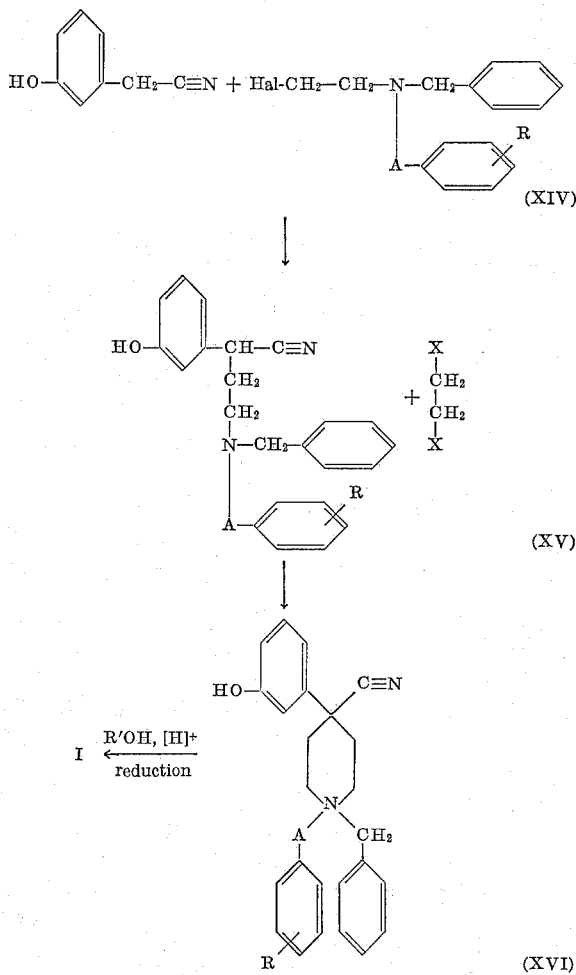

In these equations the symbols A, R, R' and X have the meanings previously defined.

The reaction of 3-hydroxybenzyl-cyanide with Compound XIV is preferably performed in the presence of powdered sodium amide and in the presence of an inert organic solvent, such as toluene, at temperatures between 50 and 200° C. In place of sodium amide, it is also possible to use phenyl sodium, sodium methylate or sodium hydride. Without isolation of the intermediate, a Compound XV, such as 1-chloro-2-bromo-ethane, 1,2-dibromo-ethane or ethylenechlorohydrin-p-toluene-sulfonate is added to the reaction mixture at a temperature of 0 to 15° C., and the mixture is heated for several hours at 50–100° C.

The hydrolysis of the nitrile group and the subsequent esterification of the carboxyl group may be accomplished under the conditions described in Method B.

The quaternary 4-(3'-hydroxyphenyl)-4-carbalkoxy-piperidinium Compound XVI thus obtained is then converted into Compound I by catalytic hydrogenation in customary fashion, preferably in the presence of alcohol and with the aid of palladized charcoal as the hydrogenation catalyst.

The basic 1-(phenyl-hydrocarbyl)-4-hydroxy-phenyl-4-carbalkoxy-piperidines may readily be converted into non-toxic acid addition salts in the usual manner, that is, by acidifying a solution of the free base with the desired pharmacologically acceptable acid, such as hydrochloric acid, sulfuric acid, methane-sulfonic acid, tartaric acid, and the like acids which are commonly used for the preparation of non-toxic, pharmacologically acceptable acid addition salts of basic organic compounds.

The following examples illustrate the preparation of representative members of the class of compounds embraced by Formula I, and will enable others to understand the present invention more completely. It should be understood, however, that the invention is not limited to the particular compounds prepared in these illustrative examples.

*Example I.*—*Preparation of 1 - (3" - methoxy - cinnamyl)-4-(3'-hydroxyphenyl) - 4-carbethoxy-piperidine hydrochloride by Method A (a)*

(a) 4-(3'-hydroxyphenyl)-piperidine-carboxylic acid-(4).—150 gm. of 1-(p-toluene-sulfonyl)-4-(3'-methoxy-phenyl)-4-cyano-piperidine, 75 gm. of phenol and 1300 cc. of 48% hydrobromic acid were admixed, and the mixture was refluxed for three hours. Thereafter, the reaction mixture was allowed to cool, 1300 cc. of water were added, and the phenol was removed by extraction with three 250 cc. portions of toluene. The aqueous solution was then evaporated to dryness and the residue was dissolved in three times its weight of water. The solution thus obtained was boiled with 15 gm. of activated charcoal, filtered and allowed to cool to room temperature. Concentrated ammonia was added slowly while stirring until the pH was between 6 and 7, whereby the sparsely soluble 4-(3'-hydroxyphenyl)-piperidine-carboxylic acid-(4) precipitated out. The precipitate was separated by vacuum filtration, washed three times with 50 cc. portions of water and once with 50 cc. of ethanol, and dried. 84 gm. (94% of theory) of 4-(3'-hydroxy-phenyl)-piperidine-carboxylic acid-(4) were obtained, which was purified by dissolving it in hot 2 N hydrochloric acid and reprecipitating it with ammonia. The purified product had a melting point of 346° C.

The product thus obtained was dissolved in ethanolic hydrochloric acid, and ether was added to this solution until it became cloudy. The hydrochloride of 4-(3'-hydroxy-phenyl)-piperidine-carboxylic acid-(4) separated out, which was recrystallized from a mixture of ethanol and ether and was dried at 50° C. It had a melting point of 278° C.

(b) *4-(3' - hydroxy-phenyl)-4-carbethoxy - piperidine hydrochloride.*—84 gm. of 4-(3'-hydroxy-phenyl)-piperidine-carboxylic acid-(4) were suspended in 1700 cc. of absolute ethanol. While stirring and cooling, dry hydrogen chloride gas was introduced into the suspension until it was saturated. Thereafter, the reaction mixture was refluxed for one hour. A clear solution was formed, which was evaporated to dryness on a water bath. The residue was dissolved in 500 cc. of absolute ethanol, and the resulting solution was again refluxed for one hour while introducing dry hydrogen chloride gas until saturation. The reaction solution was allowed to cool, was concentrated by evaporation and again cooled. 78 gm. (72% of theory) of 4-(3'-hydroxy-phenyl)-4-carbethoxy-piperidine hydrochloride were obtained. The product was recrystallized from ethanol, whereupon it had a melting point of 194° C.

(c) *1 - (3"-methoxy-cinnamyl)-4-(3'-hydroxy-phenyl)-4-carbethoxy-piperidine hydrochloride.*—2.86 gm. (0.010 mol) of 4-(3'-hydroxy-phenyl)-4-carbethoxy-piperidine hydrochloride were dissolved in a mixture of 25 cc. of absolute tetrahydrofuran and 10 cc. of dimethylformamide, and 2.02 gm. (0.011 mol) of m-methoxy-cinnamyl-chloride and 2.1 gm. (0.025 mol) of sodium bicarbonate were added to the solution. The reaction mixture was then refluxed for 1.5 hours while stirring. Subsequently, the solvent mixture was distilled off, and the residue was rinsed with 30–50 cc. of chloroform into a separating funnel, where the chloroform solution was washed three times with 20 cc. portions of water. The chloroform solution was dried over sodium sulfate, the chloroform was distilled off, the residue was dissolved in 20–30 cc. of ethanol, the resulting solution was acidified with 4.0 cc. of 2.5 N ethanolic hydrochloric acid, and ether was added to the acid solution until it became cloudy. Upon standing at 0° C. a crystalline precipitate separated out, which was isolated and recrystallized from a mixture of ethanol and ether. 2.8 gm. (65% of theory) of 1-(3″-methoxy-cinnamyl)-4-(3′-hydroxy-phenyl)-4-carbethoxy-piperidine hydrochloride of the formula

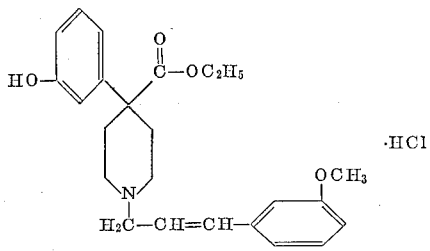

were obtained. The product had a melting point of 231° C.

*Example II.—Preparation of 1-cinnamyl-4-(3′-hydroxy-phenyl)-4-carbomethoxy-piperidine hydrochloride by Method A (a)*

(a) *4-(3′-hydroxy-phenyl)-piperidine-carboxylic acid-(4).*—150 gm. of 1-(p-toluene-sulfonyl)-4-(3′-methoxy-phenyl)-4-cyano-piperidine were admixed with 75 gm. of phenol and 1300 cc. of 48% hydrobromic acid, and the mixture was refluxed for three hours. Thereafter, the reaction mixture was allowed to cool, 1300 cc. of water were added, and the phenol was removed by extracting the solution three times with 250 cc. portions of toluene. The aqueous solution was then evaporated to dryness, and the residue was dissolved in three times its weight of water. The resulting solution was boiled with 15 gm. of activated charcoal, filtered and allowed to cool to room temperature. Concentrated ammonia was added dropwise, while stirring, until the pH of the solution was between 6 and 7, whereupon the sparsely soluble 4-(3′-hydroxy-phenyl)-piperidine-carboxylic acid-(4) precipitated out. The precipitate was separated by vacuum filtration, washed three times with 50 cc. portions of water and once with 50 cc. of ethanol, and dried. 84 gm. (94% of theory) of raw 4-(3′-hydroxy-phenyl)-piperidine-carboxylic acid-(4) were obtained. The pure acid, having a melting point of 346° C., was obtained by dissolving the raw product in 2 N hydrochloric acid and reprecipitating it with ammonia.

The purified product was dissolved in ethanolic hydrochloric acid, and ether was added to the solution until it became cloudy. The hydrochloride of 4-(3′-hydroxy-phenyl)-piperidine-carboxylic acid-(4) was obtained, which was recrystallized from a mixture of ethanol and ether and was then dried at 50° C. It had a melting point of 278° C.

(b) *4 - (3′-hydroxy-phenyl)-4-carbomethoxy-piperidine hydrochloride.*—30 gm. of 4-(3′-hydroxy-phenyl)-piperidine-carboxylic acid-(4) were suspended in 500 cc. of absolute methanol. Dry hydrogen chloride gas was introduced into the suspension until it was saturated, while stirring and cooling, and then the suspension was refluxed for one hour. A clear solution was formed, which was evaporated to dryness on a water bath. The residue was taken up in 500 cc. of absolute methanol, and the solution was again refluxed for one hour while introducing dry hydrogen chloride gas until saturation. Thereafter, the reaction solution was allowed to cool and was then placed into a refrigerator. 27 gm. (73% of theory) of 4-(3′-hydroxy-phenyl)-4-carbomethoxy-piperidine hydrochloride precipitated out. After recrystallization from methanol the product had a melting point of 243° C.

(c) *1-cinnamyl-4-(3′-hydroxy-phenyl)-4-carbomethoxy-piperidine hydrochloride.*—2.72 gm. (0.01 mol) of 4-(3′-hydroxy-phenyl)-4-carbomethoxy-piperidine hydrochloride were dissolved in a mixture of 25 cc. of absolute tetrahydrofuran and 10 cc. of dimethylformamide, and 1.7 gm. (0.011 mol) of cinnamyl chloride and 2.19 gm. (0.025 mol) of sodium bicarbonate were added to the solution. The reaction mixture was then refluxed for 1.5 hours while stirring. Thereafter, the solvent mixture was distilled off. The residue was rinsed into a separating funnel with 30–50 cc. of chloroform, and the chloroform solution was washed three times with 20 cc. portions of water. The chloroform solution was then dried over sodium sulfate, and the chloroform was distilled off. The residue was dissolved in 20–30 cc. of ethanol, the resulting solution was acidified with 2.5 N ethanolic hydrochloric acid, and ether was added to the acid solution until it became cloudy. Upon standing for several hours at 0° C. a crystalline precipitate formed, which was separated by vacuum filtration and recrystallized from a mixture of ethanol and ether. 1 gm. (26% of theory) of 1-cinnamyl-4-(3′-hydroxy-phenyl)-4-carbomethoxy-piperidine hydrochloride of the formula

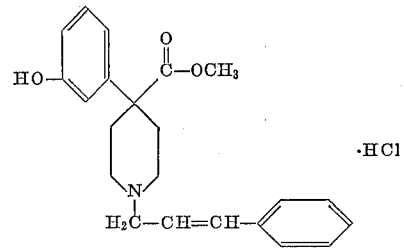

was obtained. The product had a melting point of 225° C.

*Example III.—Preparation of 1-[3-(3″-hydroxy-phenyl)-propyl]-4-(3′-hydroxy-phenyl)-4-carbethoxy-piperidine by Method A (a)*

2.86 gm. (0.010 mol) of 4-(3′-hydroxy-phenyl)-4-carbethoxy-piperidine hydrochloride were dissolved in a mixture of 25 cc. of tetrahydrofuran and 10 cc. of dimethylformamide, and 2.37 gm. (0.011 mol) of 3-(m-hydroxy-phenyl)-propyl bromide and 2.1 gm. (0.025 mol) of sodium bicarbonate were added to the solution. The reaction mixture was then refluxed for six hours. Thereafter, the solvent mixture was distilled off, and the residue was rinsed into a separating funnel with 30–50 cc. of chloroform. The chloroform solution was washed three times with 20 cc. portions of water, dried over sodium sulfate and the chloroform was distilled off. The residue was recrystallized from a mixture of petroleum ether and ethanol. 2.2 gm. (57.5% of theory) of 1-[3-(3″-hydroxy-phenyl)-propyl]-4-(3′ - hydroxy-phenyl) - 4 - carbethoxy-piperidine of the formula

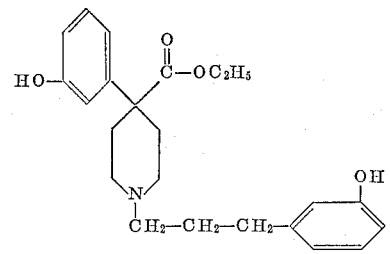

were obtained. The product had a melting point of 146–149° C.

The 3-(m-hydroxy-phenyl)-propyl bromide used as one of the starting materials in the above synthesis was obtained by boiling 48% hydrobromic acid with 3-(m-methoxy-phenyl)-propanol.

*Example IV.—Preparation of 1-[3-(4"-methoxy-phenyl)-propyl]-4-(3'-hydroxy-phenyl)-4-carbomethoxy-piperidine by Method A (a)*

2.72 gm. (0.01 mol) of 4-(3'-hydroxy-phenyl)-4-carbomethoxy-piperidine hydrochloride were dissolved in a mixture of 25 cc. of tetrahydrofuran and 10 cc. of dimethyl-formamide, and 2.05 gm. (0.011 mol) of (p-methoxy-phenyl)-propyl bromide and 2.1 gm. (0.025 mol) of sodium bicarbonate were added to the solution. The reaction mixture was then refluxed for six hours. Thereafter, the solvent mixture was distilled off on a water bath, toward the end in vacuo, and the residue was rinsed into a separating funnel with 30–50 cc. of chloroform. The chloroform solution was washed three times with 20 cc. portions of water, dried over sodium sulfate, and the chloroform was distilled off. After recrystallization of the residue from methanol, 1.2 gm. (31.5% of theory) of 1-[3-(4"-methoxy-phenyl)-propyl]-4-(3'-hydroxy - phenyl)-4-carbomethoxy-piperidine of the formula

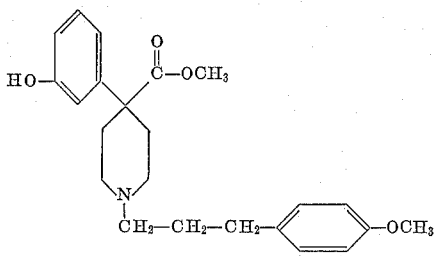

were obtained. The product had a melting point of 111–113° C.

*Example V.—Preparation of 1-(4"-methoxy-cinnamyl)-4-(3'-hydroxy-phenyl)-4 - carbethoxy-piperidine hydrochloride by Method A (d)*

(a) *1-[3-(4"-methoxy-phenyl)-3-oxo-propyl]-4-(3'-hydroxy-phenyl)-4 - carbethoxy-piperidine hydrochloride.*—A mixture of 28.6 gm. of 4-(3'-hydroxy-phenyl)-4-carbethoxy-piperidine hydrochloride (0.10 mol), 4.5 gm. of paraformaldehyde (0.15 mol), 16.5 gm. of p-methoxy-acetophenone (0.11 mol), 0.65 cc. of concentrated hydrochloric acid and 70.0 cc. of isopropanol was refluxed for one hour. 3.0 gm. (0.10 mol) more of paraformaldehyde were added, and the reaction mixture was again refluxed for two hours. Thereafter, the reaction mixture was allowed to cool and was then allowed to stand at 0° C. Raw 1-[3-(4"-methoxy-phenyl)-3-oxo-propyl]-4-(3'-hydroxy-phenyl) - 4 - carbethoxy-piperidine hydrochloride crystallized out, which was separated by vacuum filtration, washed first with a mixture of ethanol and ether (1:1) and then with ether alone, and dried. 37 gm. (82.5% of theory) of the product were obtained. Upon recrystallization from ethanol it had a melting point of 156–158° C.

(b) *1-[3-(4"-methoxy-phenyl)-3 - hydroxy-propyl] - 4 - (3'-hydroxy-phenyl)-4-carbethoxy-piperidine.*—4.48 gm. (0.010 mol) of 1-[3-(4"-methoxy-phenyl)-3-oxo-propyl]-4-(3'-hydroxy-phenyl) - 4 - carbethoxy-piperidine hydrochloride were suspended in 20 cc. of ethanol, and 8 cc. of 2.5 N sodium hydroxide were slowly added to the suspension while stirring. 0.4 gm. of 95% NaBH$_4$ (0.010 mol, i.e., four times the calculated amount) was added to the clear solution obtained thereby, and the resulting reaction mixture was stirred for two and a half hours at room temperature. Thereafter, the excess NaBH$_4$ was decomposed by acidifying the reaction mixture with 2 N hydrochloric acid. Concentrated ammonia was then added until distinct alkaline reaction, 30 cc. of water were added, and the reaction mixture was extracted with 30 cc. of chloroform. After separating the chloroform phase, the aqueous phase was again extracted with 15 cc. of chloroform. The chloroform extract solutions were combined, washed twice with 30 cc. portions of water and dried over sodium sulfate. The chloroform was evaporated, leaving as a residue raw 1-[3-(4"-methoxy-phenyl)-3-hydroxy-propyl]-4-(3'-hydroxy-phenyl)-4 - carbethoxy-piperidine, which was used without further purification for the subsequent process step. Recrystallized from a mixture of ethanol and petroleum ether, it had a melting point of 157–160° C.

(c) *1 - (4"-methoxy-cinnamyl)-4-(3'-hydroxy-phenyl)-4-carbethoxy-piperidine hydrochloride.*—The raw product obtained in step (b) above was dissolved in 20 cc. of acetone, and the resulting solution was acidified with 4 cc. of a 2.5 N solution of hydrochloric acid in acetone. The acid solution was refluxed for 24 hours, whereupon a precipitate formed. The reaction mixture was allowed to stand for 24 hours at 0° C., the precipitate was separated by vacuum filtration, washed first with acetone and then with ether, and dried. 4.1 gm. (95% of theory) of 1-(4"-methoxy-cinnanyl) - 4 - (3' - hydroxy-phenyl)-4-carbethoxy-piperidine hydrochloride of the formula

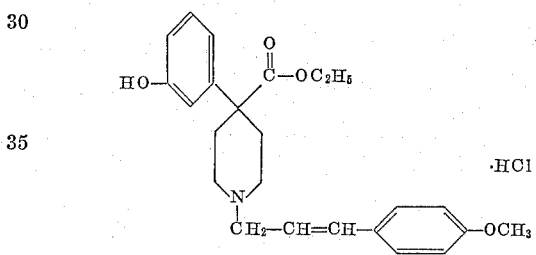

were obtained. After recrystallization from a mixture of ethanol and ether, the product had a melting point of 226° C.

The hydrochloride was dissolved in water, the solution was made alkaline, the alkaline solution was extracted with chloroform, and the extract solution was evaporated, leaving the free base as a residue. A solution of the calculated equimolar amount of methane sulfonate in 20 cc. of ethanol was added to the residue, and ether was added to the ethanolic solution until it became cloudy, whereupon 1-(4"-methoxy-cinnamyl) - 4 - (3' - hydroxyphenyl)-4-carbethoxy-piperidine methanesulfonate crystallized out. After recrystallization from a mixture of ethanol and ether, the methanesulfonate had a melting point of 138–140° C.

*Example VI*

The 1-[3-(4"-methoxy-phenyl)-3-oxo-propyl] - 4 - (3'-hydroxy-phenyl)-4-carbethoxy-piperidine hydrochloride, which is obtained as the end product in step (a) of Example V and as a starting material in step (b) of that example, may also be prepared in the following manner:

2.86 gm. (0.010 mol) of 4-(3'-hydroxy-phenyl)-4-carbethoxy-piperidine hydrochloride, 2.67 gm. (0.011 mol) of p-methoxy-β-bromo-propiophenone and 2.1 gm. (0.015 mol) of sodium carbonate were admixed with 25 cc. of tetrahydrofuran and 10 cc. of dimethylformamide, and the mixture was refluxed for four hours. Thereafter, the solvent mixture was distilled off, the residue was dissolved in chloroform, the solution was washed with water, dried over sodium sulfate, and the chloroform was evaporated. The residue was dissolved in about 20–30 cc. of ethanol, the solution was acidified with 4.0 cc. of 2.5 N ethanolic hydrochloric acid, and ether was added to the acid solution until it became cloudy. 3.5 gm. (81% of theory) of 1-[3-(4″-methoxy-phenyl) - 3 - oxo - propyl]-4-(3′-hydroxy-phenyl) - 4 - carbethoxy - piperidine hydrochloride crystallized out which, after recrystallization from ethanol, had a melting point of 156–158° C.

*Example VII.—Preparation of 1-cinnamyl-4-(3′-hydroxyphenyl) - 4 - carbethoxy-piperidine hydrochloride by Method A (b)*

(a) 1 - (3″-phenyl-3″-hydroxy-propyl)-4-(3′-hydroxyphenyl)-4-carbethoxy-piperidine hydrochloride.—2.86 gm. (0.010 mol) of 4-(3′-hydroxy-phenyl)-4-carbethoxy-piperidine hydrochloride, 2.37 gm. (0.011 mol) of 3-phenyl-3-hydroxy-1-bromo-propane were admixed with 25 cc. of tetrahydrofuran and 10 cc. of dimethylformamide, and the mixture was refluxed for eight hours. Thereafter, the solvent mixture was distilled off, and the residue was dissolved in chloroform. The chloroform solution was washed with water, dried over sodium sulfate, the chloroform was distilled off, and the residue was dissolved in a small amount of ethanol. The ethanol solution was acidified with ethanolic hydrochloric acid, ether was added to the acid solution until it turned cloudy, and the mixture was allowed to stand at 0° C. for several hours. 3.0 gm. (74.5% of theory) of 1-(3″-phenyl-3″-hydroxy-propyl) - 4 - (3′-hydroxy-phenyl)-4-carbethoxy-piperidine hydrochloride were obtained which, after recrystallization from a mixture of ethanol and ether, had a melting point of 105° C.

(b) The hydrochloride thus obtained was subjected to dehydration as described in Example V (c), yielding 1-cinnamyl - 4 - (3′-hydroxy-phenyl)-4-carbethoxy-piperidine hydrochloride of the formula

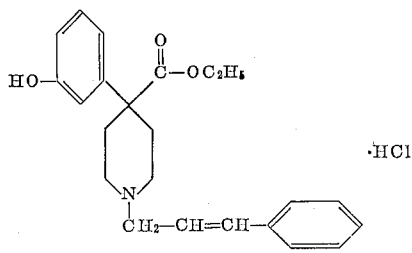

*Example VIII*

Using a procedure analogous to that described in Example II (c), 2.2 gm. (56.5% of theory) of 1-(3″-phenyl-propyl)-4-(3′-hydroxy-phenyl) - 4 - carbomethoxy-piperidine hydrochloride of the formula

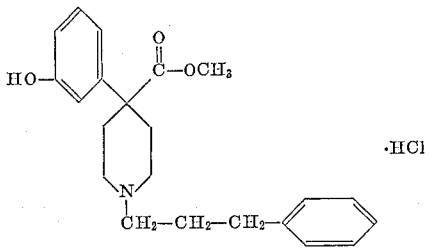

were obtained from 2.72 gm. (0.01 mol) of 4-(3′-hydroxyphenyl)-4 - carbomethoxy-piperidine hydrochloride and 2.18 gm. (0.011 mol) of 3-phenyl-propyl-bromide. The reaction mixture was refluxed for 72 hours. After recrystallization from a mixture of ethanol and ether, the reaction product of the formula shown above had a melting point of 147° C.

*Example IX*

Using a procedure analogous to that described in Example II (c), 2.0 gm. (46.5% of theory) of 1-(3″-methoxy-cinnamyl)-4-(3′-hydroxy-phenyl) - 4 - carbomethoxy-piperidine hydrochloride of the formula

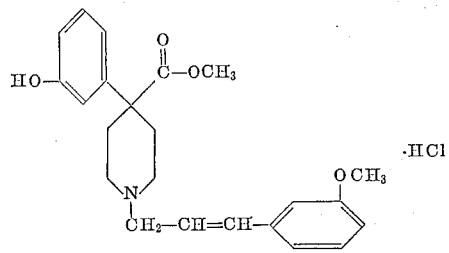

were obtained from 2.72 gm. (0.01 mol) of 4-(3′-hydroxyphenyl)-4-carbomethoxy-piperidine hydrochloride and 2.02 gm. (0.011 ml) of m-methoxy-cinnamyl chloride. After recrystallization from a mixture of ethanol and ether, the reaction product had a melting point of 217–220° C.

*Example X*

Using a procedure analogous to that described in Example II (c), 1.4 gm. (35% of theory) of 1-(4″-methyl-cinnamyl)-4-(3′-hydroxy-phenyl)-4- carbomethoxy-piperidine hydrochloride of the formula

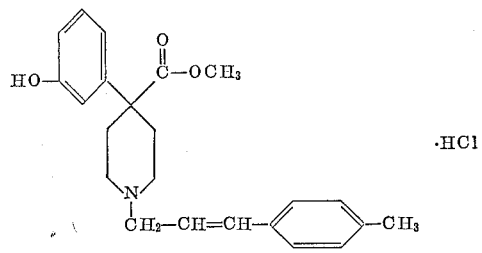

were obtained from 2.72 gm. (0.01 mol) of 4-(3′-hydroxyphenyl)-4-carbomethoxy-piperidine hydrochloride and 2.30 gm. (0.011 mol) of (p-methyl-cinnamyl)-bromide. After recrystallization from a mixture of ethanol and ether, the reaction product had a melting point of 186–188° C.

*Example XI*

Using a procedure analogous to that described in Example IV, 1.8 gm. (49% of theory) of 1-(3″-hydroxyphenyl)-4-(3′-hydroxy-phenyl) - 4 - carbomethoxy-piperidine of the formula

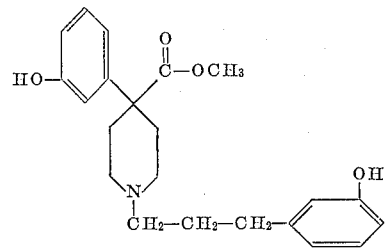

were obtained from 2.72 gm. (0.01 mol) of 4-(3′-hydroxyphenyl)-4-carbomethoxy-piperidine hydrochloride and 2.37 gm. (0.011 mol) of 3-(3′-hydroxy-phenyl)-bromide. The reaction mixture was refluxed for six hours. After recrystallization from a mixture of ethanol and petroleum ether, the reaction product had a melting point of 169–171° C.

*Example XII*

Using a procedure analogous to that described in Example II (c), 3 gm. (74% of theory) of 1-(4″-phenyl-n- butyl)-4-(3'-hydroxy-phenyl)-4-carbomethoxy-piperidine hydrochloride of the formula

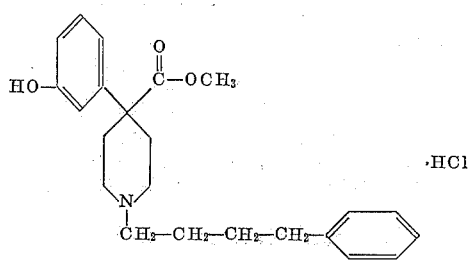

were obtained from 2.72 gm. (0.01 mol) of 4-(3'-hydroxy-phenyl)-4-carbomethoxy-piperidine hydrochloride and 2.34 gm. (0.011 mol) of (4-phenyl-n-butyl)-bromide. The reaction mixture was refluxed for 60 hours. After recrystallization from a mixture of ethanol and ether, the reaction product had a melting point of 183–185° C.

The methane-sulfonate, prepared by the method described in Example V, had a melting point of 149–150° C. after recrystallization from a mixture of ethanol and ether.

*Example XIII*

Using a procedure analogous to that described in Example I(c), 2.0 gm. (48% of theory) of 1-(4''-phenyl-n-butyl)-4-(3'-hydroxy-phenyl)-4-carbethoxy-piperidine hydrochloride of the formula

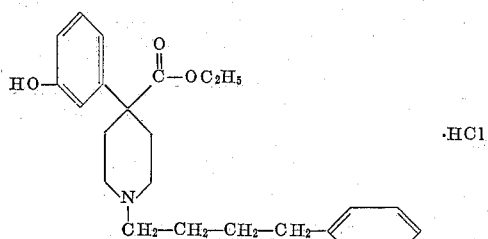

were obtained from 2.86 gm. (0.01 mol) of 4-(3'-hydroxy-phenyl)-4-carbethoxy-piperidine hydrochloride and 2.34 gm. (0.011 mol) of (4-phenyl-n-butyl)-bromide. The reaction mixture was refluxed for 40 hours. After recrystallization from a mixture of ethanol and ether, the reaction product had a melting point of 219–220° C.

The compounds according to the present invention, that is, the piperidine substitution products embraced by Formula I above and their non-toxic, pharmacologically acceptable acid addition salts, have useful pharmacodynamic properties. More particularly, the compounds of the present invention exhibit strong central analgesic properties and at the same time are effective morphine antagonists. Thus, their properties differ in kind from those of 1-(3'-phenyl-allyl)-4-phenyl-4-carbethoxy-piperidine, which is a central analgesic but not a morphine antagonist.

Examples of non-toxic, pharmacologically acceptable acid addition salts of the free bases embraced by Formula I are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicyclic acid, nicotinic acid, 2-furoic acid, 8-chlorotheophylline and the like.

For pharmacological purposes, the piperidine substitution products of the Formula I above or their non-toxic, pharmacologically useful acid addition salts may be administered in the form of dosage unit compositions consisting essentially of from 20 to 100 mgm., preferably 60 to 80 mgm., of one or more of said piperidine substitution products or their non-toxic acid addition salts in uniform admixture with a physiologically compatible inert carrier substance customarily used for the preparation of medicinal tablets, coated pills, hypodermic solutions, suppositories and the like.

The following examples illustrate various dosage unit compositions comprising piperidine substitution products of the present invention as active ingredients. The parts are parts by weight, unless otherwise specified.

*Example XIV.—Hypodermic solution*

The solution is compounded from the following ingredients:

| | |
|---|---:|
| 1-(4''-methoxy-cinnamyl)-4-(3'-hydroxy-phenyl)-4-carbethoxy-piperidine-methane-sulfonate _____parts__ | 20 |
| Glucose _____do____ | 36 |
| Methane-sulfonic acid (0.5%) _____parts by vol__ | 30 |
| Double distilled water, q.s. ad. _____do____ | 1000 |

Compounding procedure: The piperidine compound, the glucose and the methane-sulfonic acid are dissolved in the distilled water while warming. The solution is then filled into 1 cc.-ampules, and the ampules are sterilized and sealed. Each cc. contains 20 mgm. of the active ingredient.

*Example XV.—Hypodermic solution*

The solution is compounded from the following ingredients:

| | |
|---|---:|
| 1-(4''-phenyl-n-butyl)-4-(3'-hydroxy-phenyl)-4-carbomethoxy-piperidine-methane-sulfonate _____parts__ | 20 |
| Glucose _____do____ | 36 |
| Methane-sulfonic acid (0.5%) _____parts by vol__ | 30 |
| Double distilled water, q.s. ad. _____do____ | 1000 |

Compounding procedure: Same as in Example XIV. Each cc. contains 20 mgm. of the active ingredient.

*Example XVI.—Tablets*

The tablets are compounded from the following ingredients:

| | Parts |
|---|---:|
| 1-(4''-methoxy-cinnamyl)-4-(3'-hydroxy-phenyl)-4-carbethoxy-piperidine hydrochloride _____ | 40 |
| Lactose _____ | 20 |
| Corn starch _____ | 30 |
| Gelatin _____ | 3 |
| Colloidal silicic acid _____ | 1 |
| Stearic acid _____ | 2 |
| Talcum _____ | 4 |
| Total _____ | 100 |

Compounding procedure: The individual ingredients are intimately admixed with each other, and the mixture is pressed into tablets of 100 mgm. each with the aid of a tablet-making machine. Each tablet contains 40 mgm. of the active ingredient.

*Example XVII.—Tablets*

The tablets are compounded from the following ingredients:

| | Parts |
|---|---:|
| 1-(4''-phenyl-n-butyl)-4-(3'-hydroxy-phenyl)-4-carbomethoxy-piperidine hydrochloride _____ | 50 |
| Lactose _____ | 50 |
| Corn starch _____ | 60 |
| Gelatin _____ | 5 |
| Colloidal silicic acid _____ | 2 |
| Stearic acid _____ | 3 |
| Talcum _____ | 10 |
| Total _____ | 180 |

Compounding procedure: Same as in Example XVI, except that the mixture is pressed into tablets of 180 mgm. each. Every tablet contains 50 mgm. of the active ingredient.

While the above dosage unit composition examples illustrate only two selected members of the group of compounds represented by Formula I and their hydrochlorides as active ingredients, it is obvious that any of the other piperidine substitution products of the Formula I or any of the other non-toxic acid addition salts of these compounds may be substituted as active ingredients in these illustrative dosage unit compositions. Similarly, the dosage unit of the active ingredient may be varied, according to requirements, within the limits set forth above.

Although the present invention has been illustrated with the aid of certain specific embodiments, it will be readily apparent to others skilled in the art that the invention is not limited to these embodiments and that various modifications and changes may be made without departing from the spirit of the invention or the scope of the appended claims.

We claim:
1. A compound selected from the group consisting of piperidine substitution products of the formula

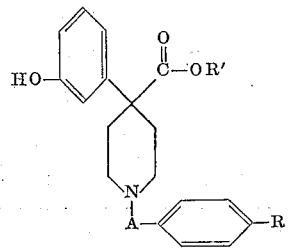

wherein

R is selected from the group consisting of hydrogen and methoxy,

R' is selected from the group consisting of methyl and ethyl, and

A is selected from the group consisting of

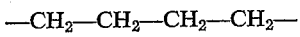

and

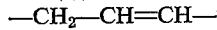

and their non-toxic, pharmacologically acceptable acid addition salts.

2. 1 - (4'' - phenyl-n-butyl)-4-(3'-hydroxy-phenyl)-4-carbomethoxy-piperidine hydrochloride.

3. 1 - (4'' - phenyl-n-butyl)-4-(3'-hydroxy-phenyl)-4-carbomethoxy-piperidine methanesulfonate.

4. 1 - (4'' - methoxy-cinnamyl)-4-(3'-hydroxy-phenyl)-4-carbethoxy-piperidine hydrochloride.

5. 1 - (4'' - methoxy-cinnamyl)-4-(3'-hydroxy-phenyl)-4-carbethoxy-piperidine methanesulfonate.

References Cited by the Examiner

UNITED STATES PATENTS

| | | | |
|---|---|---|---|
| 2,898,340 | 8/1959 | Janssen | 260—294.3 |
| 2,962,501 | 11/1960 | Cutler et al. | 260—294.3 |
| 3,000,896 | 9/1961 | Hoffmann | 260—294.7 |
| 3,004,889 | 10/1961 | Kuna | 167—65 |
| 3,024,166 | 3/1962 | Kuna | 167—65 |
| 3,080,372 | 3/1963 | Janssen | 260—294.7 |
| 3,117,139 | 1/1964 | Mooradian | 260—294.3 |

FOREIGN PATENTS

| | | |
|---|---|---|
| 221,652 | 6/1957 | Australia. |
| 613,759 | 8/1962 | Belgium. |

OTHER REFERENCES

Chemical Abstracts, vol. 58, column 512 (Jan. 7, 1963), abstract of Belgian Patent 613,759, granted Aug. 9, 1962, 8 pages.

Eddy, Journal of the American Pharmaceutical Association, Scientific Edition, vol. 39, No. 5, pages 245–251 (1950).

Janssen et al., J. Med. Pharm. Chem., vol. 2, No. 1, pages 31–34 and 40–45 (1960).

JOHN D. RANDOLPH, *Acting Primary Examiner.*

FRANK CACCIAPAGLIA, JR., *Examiner.*

PAUL L. SABATINE, *Assistant Examiner.*